C. E. BRIGHT.
CUSHION TIRE.
APPLICATION FILED DEC. 1, 1911.

1,081,425.

Patented Dec. 16, 1913.

Witnesses

Inventor
Colonel E. Bright

By
Attorney

UNITED STATES PATENT OFFICE.

COLONEL E. BRIGHT, OF COLUMBUS, OHIO.

CUSHION-TIRE.

1,081,425.  Specification of Letters Patent.  Patented Dec. 16, 1913.

Application filed December 1, 1911.  Serial No. 663,364.

*To all whom it may concern:*

Be it known that I, COLONEL E. BRIGHT, a citizen of the United States, residing at Columbus, in the county of Franklin and State of Ohio, have invented certain new and useful Improvements in Cushion-Tires, of which the following is a specification.

My invention relates to an improvement in cushion tires and is designed as an improvement upon the structure shown in my application filed Sept. 16, 1910, Serial Number 582,294.

My present invention aims to provide an extremely simplified structure wherein the resiliency of the tire is adequately maintained.

It will be understood that cushion tires, in order to supersede the pneumatic tire generally in use with motor vehicles, must be possessed of a certain resiliency and must maintain such resiliency throughout its life. I have accomplished this by the provision of a tread or casing substantially similar to the normal tread or casing and having a plurality of internal reinforcing mediums in the form of interfitting sections of a complemental nature.

Figure 1:
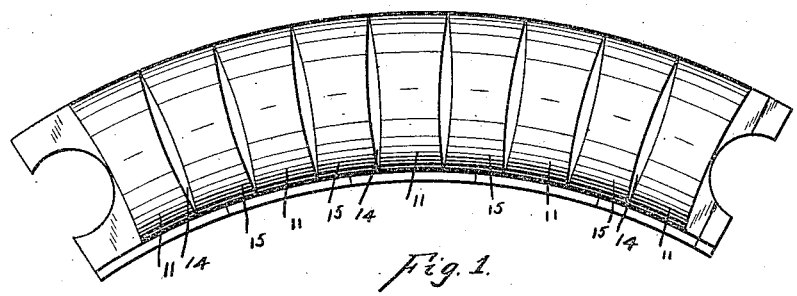
Figure 2:
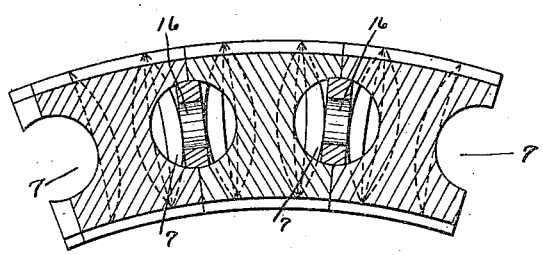
Figure 3:
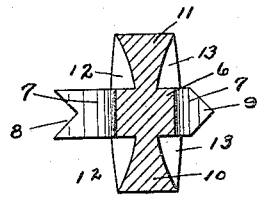
Figure 4:
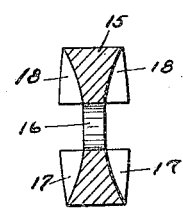
Figure 5:
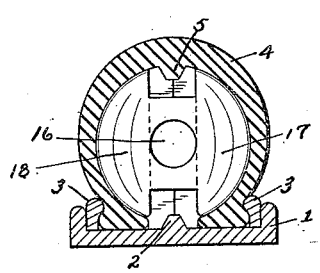
Figure 6:
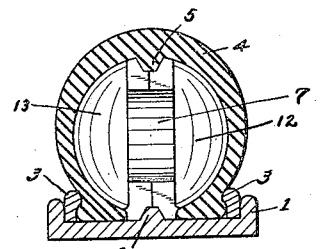

The preferred embodiment of my invention is shown in the accompanying drawings, in which similar characters of reference designate corresponding parts, and in which:

Figure 1 is an elevation of a section of the inner reinforcing device for the casing or tread, Fig. 2 is a vertical longitudinal section taken through several assembled sections, Fig. 3 is a transverse horizontal section of one of the longitudinal members of my device, Fig. 4 is a transverse horizontal section of one of the transverse members used in my invention, Fig. 5 is a transverse section taken through the tire and showing a side elevation of a transverse member mounted upon a longitudinal member, and, Fig. 6 is a transverse section of a tire showing an end elevation of the longitudinal section.

In the drawings, my invention is shown as applied to a rim 1 having a peripheral ridge 2 desirably of angular formation and having clencher elements 3 for the coöperative clenching of a casing 4. This casing 4 is provided upon its internal periphery with a complemental ridge formation 5 of angular contour, which is desirably in vertical alinement with the ridge 2 upon the rim 1.

Fitting within the casing 4 are a plurality of longitudinal sections 6 having concave recesses 7 in their abutting ends for the purpose of resiliency. These abutting ends are desirably provided with angular grooves and tongues 8 and 9 respectively, desirably extending vertically and these grooves and tongues interfit to maintain a continuous alinement of the longitudinal elements. Mounted upon each longitudinal element and desirably intermediate its length, are lateral formations 10 and 11 disposed and formed integrally upon either side. It will be noted that these lateral formations have their sides undercut as at 12 and 13 and have their edges inwardly curved between the top and the bottom thereof as shown as 14 in Fig. 1.

One important feature of this invention resides in the provision of a base for such longitudinal members of such structural formation that they coact with the feet of the casing 4 to brace the same against the clencher elements 3 and by a complemental action therewith to securely maintain the tire in proper position upon the rim.

Coactive with the longitudinal members and disposed alternately therewith are transverse members 15 having central cutaway portions 16 of any desirable formation and shown as being circular. These transverse members are constituted of a central web portion and of wing members 17 and 18 which have their sides formed similarly to the sides of the lateral formations 10 and 11. The sides of the transverse members and the lateral formations on the longitudinal members are adapted to abut in the position shown in Fig. 1 and in their abutting relation, there remains a space substantially identical with that shown in this figure. This peripheral space together with the undercut surfaces constitute a structure well calculated to produce and maintain a resiliency of a high quality. This natural resiliency due to the room for the expansion and contraction of the elements is in part assisted and promulgated by what may be termed air cushions between the adjacent faces. It will be understood that the webs of the transverse members fit within the circle formed by the cut-away portions 7 and that their wing members extend along the sides of the longitudinal members into abutting relation with the lateral formations thereon.

It will be seen that I have provided an extremely simple structure and it will be understood that the structure shown is desirably to be made entirely of rubber or material having a similar resiliency.

What I claim, is—

1. A cushion tire comprising a casing, a plurality of longitudinally extending sections abutting each other and forming an annular web around the interior of the casing, lateral wing formations carried by each section, and a plurality of transverse sections carrying complemental wing formations.

2. A cushion tire comprising a casing, a plurality of longitudinally extending sections abutting each other and forming an annular upright web around the interior of the casing, said web having a horizontal aperture therethrough at each point of abutment, lateral wing formations carried by each section, and a plurality of transverse sections extending through said apertures and carrying complemental wing formations.

3. A cushion tire comprising a casing, a plurality of longitudinally extending sections abutting each other and forming an annular web around the interior of the casing, said sections carrying lateral wing formations the latter being undercut, a plurality of transverse sections carrying complemental wing formations the latter being undercut, said two wing formations being adjacent each other when in assembled condition, said undercut portions forming air pockets.

4. A cushion tire comprising a casing, a plurality of longitudinally extending sections abutting each other and forming an annular upright web around the interior of the casing, said web being apertured at each point of abutment, lateral undercut wing formations carried by said sections and a plurality of transverse sections mounted within said apertures and carrying complemental wing formations.

5. A cushion tire comprising a casing, a plurality of longitudinally extending sections abutting each other and forming an annular web around the interior of the casing, lateral undercut wing formations carried by each section, and a plurality of transverse sections carrying complemental wing formations and being centrally apertured.

6. A cushion tire comprising a casing, a plurality of longitudinally extending sections abutting each other, said sections carrying lateral undercut wing formations, a plurality of transverse sections carrying complemental wing formations, said wing formations having their edges inwardly curved from top to bottom forming elliptical slots in both sides of the tire body within the casing.

7. In combination with a vehicle wheel having a rim with an outer peripheral ridge, a tire casing with an inner peripheral ridge, and a plurality of alternating longitudinal and transverse sections fitting within said casing and grooved to lock upon the said ridges.

In testimony whereof I affix my signature in presence of two witnesses.

COLONEL E. BRIGHT.

Witnesses:
  WALTER E. L. BOCK,
  A. L. PHELPS.

---

Copies of this patent may be obtained for five cents each, by addressing the "Commissioner of Patents, Washington, D. C."